United States Patent
Ezrielev et al.

(10) Patent No.: US 12,326,790 B2
(45) Date of Patent: Jun. 10, 2025

(54) RECOVERY BY MULTI-CLOUD HANDOFF

(71) Applicant: Dell Products L.P., Round Rock, TX (US)

(72) Inventors: Ofir Ezrielev, Beer Sheva (IL); Jehuda Shemer, Kfar Saba (IL); Amihai Savir, Newton, MA (US)

(73) Assignee: Dell Products L.P., Round Rock, TX (US)

( * ) Notice: Subject to any disclaimer, the term of this patent is extended or adjusted under 35 U.S.C. 154(b) by 193 days.

(21) Appl. No.: 18/047,009

(22) Filed: Oct. 17, 2022

(65) Prior Publication Data

US 2024/0126665 A1    Apr. 18, 2024

(51) Int. Cl.
*G06F 11/20* (2006.01)
*G06F 21/56* (2013.01)

(52) U.S. Cl.
CPC ........ *G06F 11/2033* (2013.01); *G06F 21/568* (2013.01)

(58) Field of Classification Search
CPC . G06F 11/1469; G06F 11/2033; G06F 21/568
See application file for complete search history.

(56) References Cited

U.S. PATENT DOCUMENTS

| | | | | |
|---|---|---|---|---|
| 11,068,356 | B2* | 7/2021 | Agrawal | G06F 11/1461 |
| 11,099,956 | B1* | 8/2021 | Polimera | G06F 9/45558 |
| 2022/0114062 | A1* | 4/2022 | Madan | G06F 11/1469 |
| 2022/0311757 | A1* | 9/2022 | Balasubramanian | H04L 9/0877 |

* cited by examiner

*Primary Examiner* — Nadeem Iqbal
(74) *Attorney, Agent, or Firm* — Workman Nydegger

(57) ABSTRACT

One example method includes receiving, at a remote site from a production site, copies of production site assets, storing, at the remote site, the copies of the production site assets, using, at the remote site, the copies of the production site assets to restore a temporary production site, running the temporary production site at the remote site, and restoring, from the remote site to the production site, the copies of the production site assets.

18 Claims, 3 Drawing Sheets

RECOVERY BY MULTI-CLOUD HANDOFF

FIELD OF THE INVENTION

Embodiments of the present invention generally relate to failover, and recovery, of a production site. More particularly, at least some embodiments of the invention relate to systems, hardware, software, computer-readable media, and methods, for implementing and using a temporary failover site while an associated production site is offline.

BACKGROUND

Contrary to common belief, data recovery time after a ransomware attack may not be constrained by backup/restore time. Rather, the predominant constraint is that insurance companies, law enforcement, and sometime even government agencies, take over the production site in order to conduct damage assessments and forensic investigation. This process usually takes a few days to conclude, after which the environment is cleansed, to ensure no ransomware is left, and then the backups are restored. This restoration process may take a few hours, or more, depending on the size of the site.

A problem with this approach is that while the production site is being evaluated, the production operations are shut down. Thus, the enterprise may be at a standstill until the investigation is concluded. While, as noted, the production site may only be unavailable for a few days, even this seemingly short timespan may be quite significant to the enterprise in terms of lost business, and/or other considerations.

BRIEF DESCRIPTION OF THE DRAWINGS

In order to describe the manner in which at least some of the advantages and features of the invention may be obtained, a more particular description of embodiments of the invention will be rendered by reference to specific embodiments thereof which are illustrated in the appended drawings. Understanding that these drawings depict only typical embodiments of the invention and are not therefore to be considered to be limiting of its scope, embodiments of the invention will be described and explained with additional specificity and detail through the use of the accompanying drawings.

DETAILED DESCRIPTION OF SOME EXAMPLE EMBODIMENTS

Figure 1:
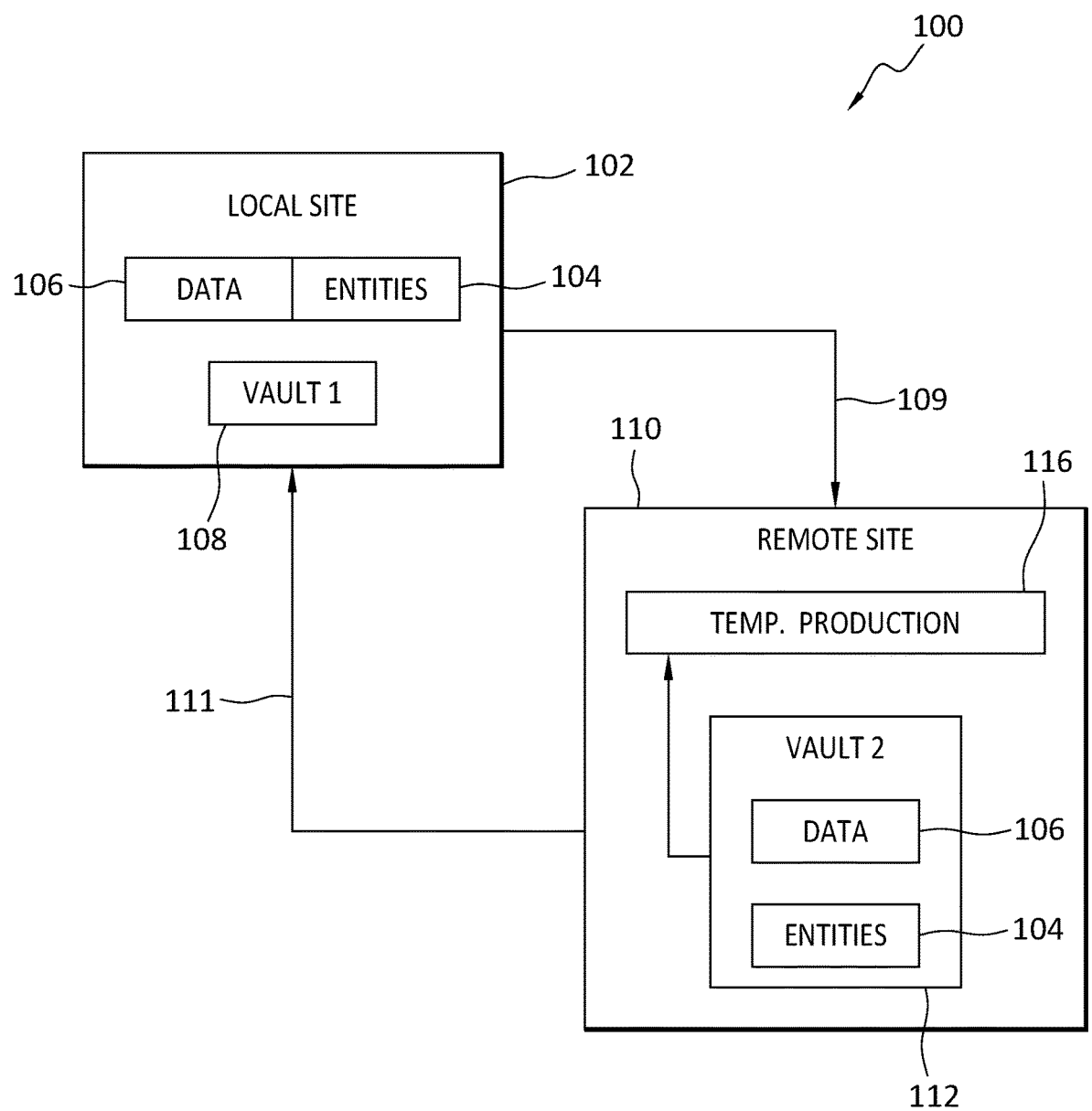
FIG. 1 discloses aspects of an example architecture according to an embodiment.

Embodiments of the present invention generally relate to failover, and recovery, of a production site. More particularly, at least some embodiments of the invention relate to systems, hardware, software, computer-readable media, and methods, for implementing and using a temporary failover site while an associated production site is offline.

In general, example embodiments of the invention may include creation and use of a failover site, which may comprise a public cloud site, that may be used to conduct production operations while the production site is down. Production site assets which may comprise a combination of virtual, and/or physical, elements may be replicated to the failover site. Similarly, production site data may be replicated to the failover site. Then, when the production site is brought back up, part or all of the failover site may be synched back to the production site, so as to enable resumption of normal production operations at the production site. The production site and/or the failover site may be virtual, physical, or may comprise a combination of virtual and physical elements.

In one example embodiment, data and virtual entities of a production site may be replicated to a vault of an off-premises site. When the production site becomes unavailable for some reason, the data and virtual entities can be restored to the off-premises site from the vault at the off-premises site. The restored system and data may then be used as a temporary production site. When the production site is back up and ready for use, the virtual entities, and data differentials that have accumulated at the remote site while the production site was down, may then be restored from the remote site to the production site.

Embodiments of the invention, such as the examples disclosed herein, may be beneficial in a variety of respects. For example, and as will be apparent from the present disclosure, one or more embodiments of the invention may provide one or more advantageous and unexpected effects, in any combination, some examples of which are set forth below. It should be noted that such effects are neither intended, nor should be construed, to limit the scope of the claimed invention in any way. It should further be noted that nothing herein should be construed as constituting an essential or indispensable element of any invention or embodiment. Rather, various aspects of the disclosed embodiments may be combined in a variety of ways so as to define yet further embodiments. Such further embodiments are considered as being within the scope of this disclosure. As well, none of the embodiments embraced within the scope of this disclosure should be construed as resolving, or being limited to the resolution of, any particular problem(s). Nor should any such embodiments be construed to implement, or be limited to implementation of, any particular technical effect(s) or solution(s). Finally, it is not required that any embodiment implement any of the advantageous and unexpected effects disclosed herein.

In particular, one advantageous aspect of an embodiment of the invention is that normal production site operations may continue while the production site itself is down. As another example, a failback process from a remote site to a production site may proceed relatively quickly since only data differentials may need to be restored. Various other advantages aspects of some example embodiments will be apparent from this disclosure.

It is noted that embodiments of the invention, whether claimed or not, cannot be performed, practically or otherwise, in the mind of a human. Accordingly, nothing herein should be construed as teaching or suggesting that any aspect of any embodiment of the invention could or would be performed, practically or otherwise, in the mind of a human. Further, and unless explicitly indicated otherwise herein, the disclosed methods, processes, and operations, are contemplated as being implemented by computing systems that may comprise hardware and/or software. That is, such methods processes, and operations, are defined as being computer-implemented.

A. Aspects of an Example Architecture and Environment

The following is a discussion of aspects of example operating environments for various embodiments of the invention. This discussion is not intended to limit the scope of the invention, or the applicability of the embodiments, in any way.

In general, embodiments of the invention may be implemented in connection with systems, software, and components, that individually and/or collectively implement, and/or cause the implementation of, data protection operations which may include, but are not limited to, data replication operations, IO replication operations, data read/write/delete operations, data deduplication operations, data backup operations, data restore operations, data cloning operations, data archiving operations, and disaster recovery operations. More generally, the scope of the invention embraces any operating environment in which the disclosed concepts may be useful.

At least some embodiments of the invention provide for the implementation of the disclosed functionality in existing backup platforms, and storage environments such as the Dell PowerProtect Cyber Recovery system (CR). In general however, the scope of the invention is not limited to any particular data backup platform or data storage environment.

New and/or modified data collected and/or generated in connection with some embodiments, may be stored in a data protection environment that may take the form of a public or private cloud storage environment, an on-premises storage environment, and hybrid storage environments that include public and private elements. Any of these example storage environments, may be partly, or completely, virtualized. The storage environment may comprise, or consist of, a datacenter which is operable to service read, write, delete, backup, restore, and/or cloning, operations initiated by one or more clients or other elements of the operating environment. Where a backup comprises groups of data with different respective characteristics, that data may be allocated, and stored, to different respective targets in the storage environment, where the targets each correspond to a data group having one or more particular characteristics.

Example cloud computing environments, which may or may not be public, include storage environments that may provide data protection functionality for one or more clients. Another example of a cloud computing environment is one in which processing, data protection, and other, services may be performed on behalf of one or more clients. Some example cloud computing environments in connection with which embodiments of the invention may be employed include, but are not limited to, Microsoft Azure, Amazon AWS, Dell EMC Cloud Storage Services, and Google Cloud. More generally however, the scope of the invention is not limited to employment of any particular type or implementation of cloud computing environment.

In addition to the cloud environment, the operating environment may also include one or more clients that are capable of collecting, modifying, and creating, data. As such, a particular client may employ, or otherwise be associated with, one or more instances of each of one or more applications that perform such operations with respect to data. Such clients may comprise physical machines, or virtual machines (VM), containerized computing solutions, mobile devices, IoT (Internet of Things) systems and devices, edge devices and systems, and any other systems and devices, which may comprise hardware and/or software, that are capable of generating new and/or modified data.

As used herein, the term 'data' is intended to be broad in scope. Thus, that term embraces, by way of example and not limitation, data segments such as may be produced by data stream segmentation processes, data chunks, data blocks, atomic data, emails, objects of any type, files of any type including media files, word processing files, spreadsheet files, and database files, as well as contacts, directories, sub-directories, volumes, and any group of one or more of the foregoing.

Example embodiments of the invention are applicable to any system capable of storing and handling various types of objects, in analog, digital, or other form. Although terms such as document, file, segment, block, or object may be used by way of example, the principles of the disclosure are not limited to any particular form of representing and storing data or other information. Rather, such principles are equally applicable to any object capable of representing information.

As used herein, the term 'backup' is intended to be broad in scope. As such, example backups in connection with which embodiments of the invention may be employed include, but are not limited to, full backups, partial backups, clones, snapshots, and incremental or differential backups.

A. Aspects of an Example Architecture and Operating Environment

With attention now to FIG. 1, details are provided concerning an example architecture, generally denoted at 100, in connection with which some embodiments may be implemented. The configuration presented in FIG. 1 is by way of illustration and is not intended to limit the scope of the invention in any way.

In the example of FIG. 1, a production site 102, which may also be referred to as a 'local site' may be provided at which the normal operations of an enterprise are performed. The production site 102 may comprise various entities 104, such as VMs or containers for example, that operate to perform production site functions. As such, the entities 104 may include various applications, among other things. Further, the entities 104 may operate to generate data 106. Copies of the entities 104 and data 106 may be stored locally in a vault 108, which may be air-gapped. One example of such a vault is a Dell PowerProtect Cyber Recovery system (CR) vault.

Note that as used herein, an 'air gap' embraces a physical isolation, or separation, of a storage vault from any exterior system or device that may be susceptible to attack. That is, when the air gap associated with a vault is open, the air gapped vault is physically detached, and unconnected, from such exterior devices. As such, when the air gap is open, the air gapped vault is not accessible by any form of wireless, or hardwire, including optical, communication system or device. Conversely, when the air gap is closed, the vault, and some or all of its contents, may be accessible by external systems and devices, such as an application host for example, whether by wireless and/or hardwired communication channels. In the example of FIG. 1, the data 106 and entities 104 may be communicated to the vault 108 only when an air gap protecting the vault 108 is closed.

Thus, with reference to the example of FIG. 1, the vaults 108 and 112 and part, or all, of their respective contents, may be isolated from other elements of the production site 102 and the remote site 110, and from external entities, when the respective air gaps protecting those vaults 108 and 112 are open. When the air gaps are closed, the vaults 108 and 112 may be able to communicate with the production site 102 and the remote site 110 to transfer data, information, and metadata, for example, in either or both directions, between the production site 102 and the remote site 110.

With continued reference to FIG. 1, a remote site 110 may also be provided with which the production, or local, site 102 may communicate. The copies of the data 106 and entities 104 that are stored in the vault 108 may be communicated 109 by the production site 102 to the remote site 110, and particularly, to the vault 112. In an embodiment, the vault 112 may be a Dell PowerProtect Cyber Recovery system (CR) vault that can be isolated by way of another air gap.

When the local, or production, site 102 is down for some reason, such as due to inspection and evaluation by a law enforcement agency or insurance company for example, the entities 104 and data 106 in the vault 112 may be restored into a temporary production site 116 running on the remote site 110. In this way, production operations may continue/resume even after the production site 102 is shut down. Because the temporary production site 116 has a relatively recent copy of the data 106 and entities 104, the temporary production site 116 may only need to store data differentials resulting from operations that have taken place at the temporary production site 116 after the production site 102 has been shut down. As such, when the production site 102 becomes available again, the production site 102 may be restored relatively quickly using either local or remote copies of the entities 104, and by restoring 111 the data differentials to the production site 102 from the remote site 110.

B. Further Aspects of Some Example Embodiments

With continued reference to the illustrative example of FIG. 1, further details are provided now concerning aspects of some example embodiments. These details are provided by way of illustration and are not intended to limit the scope of the invention in any way.

Initially, it is noted that where the production site 102 is predominantly virtual, such as by virtue of the use of VMs, containers, or Kubernetes-based elements, one embodiment may employ cloud or colocation site infrastructure, such as the temporary production site 116 for example, as a temporary location, to which to restore working copies of virtual devices, and data, that may be used for failover use cases. The temporary production site 116 may also be used, on connection with a migration platform such as vMotion to handoff from the temporary production site 116 to the production site 102 once the production site 102 is ready to be restored.

In one embodiment, respective EMC DataDomain/protection appliances may be employed in either standard form factor or (CR)/Vault form factor on the local site 102 and the remote site 110, which may also be referred to as a 'target' site. In an embodiment, the vault 108 may be omitted, and restore operations performed from the vault 112. Where both vaults 108 and 112 are employed, a data replication link may be created between the vault 108 and vault 112.

Once the data is at the remote site 110, such as in the vault 112 or a data protection appliance hosted at the remote site 110, when a recovery event occurs, virtual entities can be restored to the remote site 112 from the vault 112 or data protection appliance. One embodiment may assume that the virtualization technology at the local site 102 and in the remote site 110 is the same, but even if not, conversion functionality may be provided by either cloud or other vendors, such as DellEMC for example. The restored entities 104 and data 106 can be now used as the temporary production site 116, which may also be referred to as a failover site, and run production workloads while the production site 102 is down, or otherwise inaccessible. As noted earlier, the production site 102 may be shut down to prevent the spread of any malware, and in order to be examined by an auditor, forensic analyst, insurance company, or law enforcement, for example.

When the production site 102 has been cleansed and is ready to be restored, the data 106 and/or entities 104 at the remote site 110 may be synchronized back to the local site 102 using a process that may be referred to synchronization, restore, or failback. This process may be performed in various ways.

For example, a migration platform such as vMotion may be used to migrate the entities 104, which may be virtual, to the local site 102 from the remote site 110, if the virtualization stacks at the production site 102 and the remote site 110 match. This move may be seamless, but it may take significant time as the data may be in its raw/open form and there is no benefit of dedup or compression, although data compression over the wire may be possible as the data is transferred from the remote site 110 to the production site 102.

As another example of a failback process for synchronizing the data 106 and/or entities 104 at the remote site 110 back to the local site 102, the entities 104 and data 106 in the remote site 110 may be backed up to the vault 112. As entities 104 and data 106 originated from the vault 112, it may be adequate to capture just the diffs, that is, any changes or 'differentials' occurring to the data 106 and/or entities 104, that accumulated over the failover period when the temporary production site 116 was running.

In an embodiment, the differentials may be deduplicated before being sent from the remote site 110 to the production site 102, so the restored production site 102 will now include all data changes that were incurred during the failover period. This approach provides an efficient way to transfer data changes to the production site 102 but may require performance of a data restore process at the production site 102. Note that the provisioning of entities 104, such as virtual entities, may be performed before those entities 104 are restored to the production site 102 from the remote site 110. Similarly, a basic baseline restore may be performed at the production site 102 before the differentials are transferred. In this way, an embodiment may, as a final operation, apply the transferred differentials in order to reduce the overall time needed to restore the production site 102, that is, to minimize the time between the time when the temporary production site 116 is brought up and the time when the production site 102 is active again.

C. Further Discussion

As will be apparent from this disclosure, example embodiments may provide various useful aspects and features. For example, an embodiment may use a public cloud comprising a time-limited vault, that is, a vault that may be used only for a limited amount of time, to free up infrastructure to set up a temporary production site while the main production site is down. Advantageously, this approach may shorten the downtime of the production site both during production site analysis, and failback to the production site from the remote site.

D. Example Methods

Figure 2:
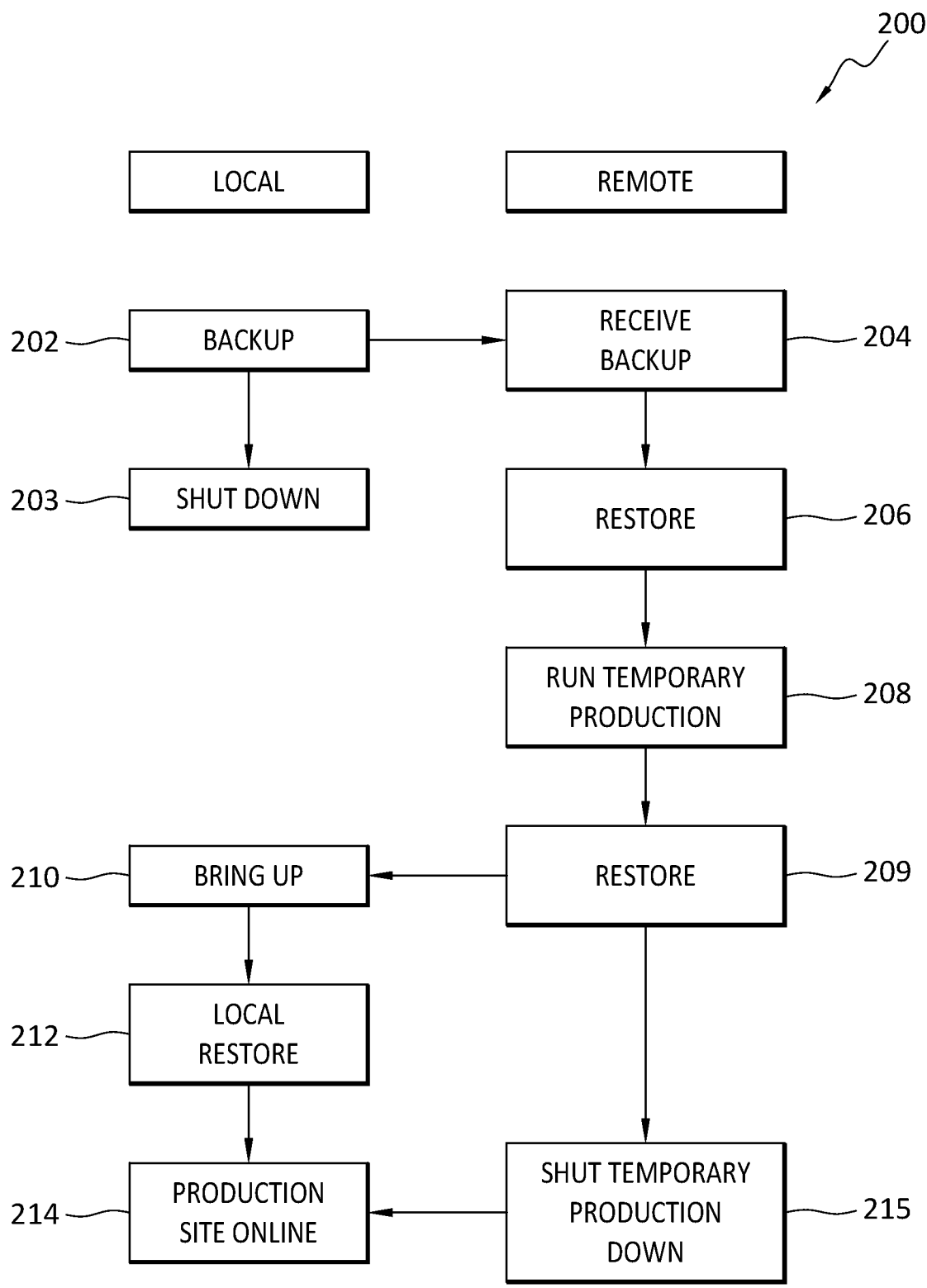
FIG. 2 discloses aspects of an example method according to an embodiment.

It is noted with respect to the disclosed methods, including the example method of FIG. 2, that any operation(s) of any of these methods, may be performed in response to, as a result of, and/or, based upon, the performance of any preceding operation(s). Correspondingly, performance of one or more operations, for example, may be a predicate or trigger to subsequent performance of one or more additional operations. Thus, for example, the various operations that may make up a method may be linked together or otherwise associated with each other by way of relations such as the examples just noted. Finally, and while it is not required, the individual operations that make up the various example methods disclosed herein are, in some embodiments, performed in the specific sequence recited in those examples. In other embodiments, the individual operations that make up a disclosed method may be performed in a sequence other than the specific sequence recited.

Directing attention now to FIG. 2, an example method according to an embodiment is denoted generally at 200. In an embodiment, the method 200 may be performed cooperatively by a local, or production, site, and a remote site.

The example method 200 may begin when assets, such as entities and data, of a production site are backed up 202 to a remote site. In an embodiment, the assets may be transmitted from a vault or appliance at the production site to a vault or appliance at the remote site. This vault-to-vault communication, possibly effected by way of a dedicated communication line between the vaults, which may each be air gapped, may provide a relatively high level of security. Alternatively, the production site may retrieve the assets from a local vault, and then transmit the assets to the remote site, which may then receive and store the assets in the remote vault.

Once copies of the assets are received 204 and stored in the remote vault, those assets may then be used to restore 204, at the remote site, a temporary production site. That is, the assets may be restored 204 from the vault at the remote site into a temporary production site at the remote site. At some point after the asset backup 202 has been transmitted to the remote site, the production site may be shut down 203, or otherwise made inaccessible. As disclosed herein, the shutdown 203 may enable, for example, forensic analysis of systems and events at the production site.

After the assets have been restored 206, the temporary production site may run 208 at the remote site. The running of the temporary production site 208 may comprise performing any, or all, operations that otherwise would have been performed at the production site. Such operations may include any of the operations disclosed herein that involve data in some way.

At some point after the temporary production site has come online, the assets of the temporary production site, which may include data differentials, may be restored 209 to the production site. In an embodiment, those assets may first be backed up by the temporary production site to the vault at the remote site, and then restored 209 from the vault at the remote site to the production site, and in some particular embodiments, to the vault at the production site. The restored assets may comprise VMs, containers, data, and any other information or entities needed to make the production site fully operational.

In an embodiment, only part of the assets, such as VMs for example, that may be needed to restore the functionality of the production site are restored from the remote site. For example, if only data differentials are restored to the production site, the base data to which those data differentials relate may be restored to the production site from a vault at the production site.

After some, or all, of the assets have been restored 209 to the production site, the production site may be brought back up 210 so that it can be restored. In general, the production site may be made available for restoration whenever there is no longer a need for it to be isolated and/or disabled, such as after the production site has been cleansed of malware, and/or an auditing body has completed an audit or forensic analysis of the production site.

With some, or all, of the assets restored 209 to the production site, the production site may then be brought back up 210. As noted above, a local restore 212 may be performed at the production site to restore assets, such as data for example, that may be needed to restore the functionality of the production site. The data may be restored, for example, from a vault at the production site. In some embodiments, the local restore 212 may be omitted.

After the production site has been brought back up 210 and restored 212, the production site may then be in an online 214 status and ready to resume normal operations. Note that at some point after the assets have been restored 209 from the remote site to the production site, the temporary production site may be shut down 215.

E. Further Example Embodiments

Following are some further example embodiments of the invention. These are presented only by way of example and are not intended to limit the scope of the invention in any way.

Embodiment 1. A method, comprising: receiving, at a remote site from a production site, copies of production site assets; storing, at the remote site, the copies of the production site assets; using, at the remote site, the copies of the production site assets to restore a temporary production site; running the temporary production site at the remote site; and restoring, from the remote site to the production site, the copies of the production site assets.

Embodiment 2. The method as recited in embodiment 1, wherein the copies of the production site assets received by the remote site are stored in a vault at the remote site.

Embodiment 3. The method as recited in any of embodiments 1-2, wherein the copies of the production site assets are received by the remote site from a vault at the production site.

Embodiment 4. The method as recited in any of any of embodiments 1-3, wherein the copies of the production site assets comprise any one or more of: data; virtual machines; and, containers.

Embodiment 5. The method as recited in any of embodiments 1-4, wherein restoring the temporary production site comprises restoring the copies of the production site assets from a vault at the remote site.

Embodiment 6. The method as recited in any of embodiments 1-5, wherein when the temporary production site is running, the temporary production site receives new and/or modified data from an entity.

Embodiment 7. The method as recited in any of embodiments 1-6, wherein the temporary production site runs while the production site is down.

Embodiment 8. The method as recited in any of embodiments 1-7, wherein the restoring, from the remote site to the production site, the copies of the production site assets, is performed after a time period during which the production site was down.

Embodiment 9. The method as recited in any of embodiments 1-8, wherein after the restoring, from the remote site to the production site, the copies of the production site assets, the temporary production site is shut down.

Embodiment 10. The method as recited in any of embodiments 1-9, wherein as part of the restoring of the copies of the production site assets, the remote site transmits data differentials to the production site.

Embodiment 11. A system, comprising hardware and/or software, operable to perform any of the operations, methods, or processes, or any portion of any of these, disclosed herein.

Embodiment 12. A non-transitory storage medium having stored therein instructions that are executable by one or more hardware processors to perform operations comprising the operations of any one or more of embodiments 1-10.

F. Example Computing Devices and Associated Media

The embodiments disclosed herein may include the use of a special purpose or general-purpose computer including various computer hardware or software modules, as discussed in greater detail below. A computer may include a processor and computer storage media carrying instructions that, when executed by the processor and/or caused to be executed by the processor, perform any one or more of the methods disclosed herein, or any part(s) of any method disclosed.

As indicated above, embodiments within the scope of the present invention also include computer storage media, which are physical media for carrying or having computer-executable instructions or data structures stored thereon. Such computer storage media may be any available physical media that may be accessed by a general purpose or special purpose computer.

By way of example, and not limitation, such computer storage media may comprise hardware storage such as solid state disk/device (SSD), RAM, ROM, EEPROM, CD-ROM, flash memory, phase-change memory ("PCM"), or other optical disk storage, magnetic disk storage or other magnetic storage devices, or any other hardware storage devices which may be used to store program code in the form of computer-executable instructions or data structures, which may be accessed and executed by a general-purpose or special-purpose computer system to implement the disclosed functionality of the invention. Combinations of the above should also be included within the scope of computer storage media. Such media are also examples of non-transitory storage media, and non-transitory storage media also embraces cloud-based storage systems and structures, although the scope of the invention is not limited to these examples of non-transitory storage media.

Computer-executable instructions comprise, for example, instructions and data which, when executed, cause a general purpose computer, special purpose computer, or special purpose processing device to perform a certain function or group of functions. As such, some embodiments of the invention may be downloadable to one or more systems or devices, for example, from a website, mesh topology, or other source. As well, the scope of the invention embraces any hardware system or device that comprises an instance of an application that comprises the disclosed executable instructions.

Although the subject matter has been described in language specific to structural features and/or methodological acts, it is to be understood that the subject matter defined in the appended claims is not necessarily limited to the specific features or acts described above. Rather, the specific features and acts disclosed herein are disclosed as example forms of implementing the claims.

As used herein, the term 'module' or 'component' may refer to software objects or routines that execute on the computing system. The different components, modules, engines, and services described herein may be implemented as objects or processes that execute on the computing system, for example, as separate threads. While the system and methods described herein may be implemented in software, implementations in hardware or a combination of software and hardware are also possible and contemplated. In the present disclosure, a 'computing entity' may be any computing system as previously defined herein, or any module or combination of modules running on a computing system.

In at least some instances, a hardware processor is provided that is operable to carry out executable instructions for performing a method or process, such as the methods and processes disclosed herein. The hardware processor may or may not comprise an element of other hardware, such as the computing devices and systems disclosed herein.

In terms of computing environments, embodiments of the invention may be performed in client-server environments, whether network or local environments, or in any other suitable environment. Suitable operating environments for at least some embodiments of the invention include cloud computing environments where one or more of a client, server, or other machine may reside and operate in a cloud environment.

Figure 3:
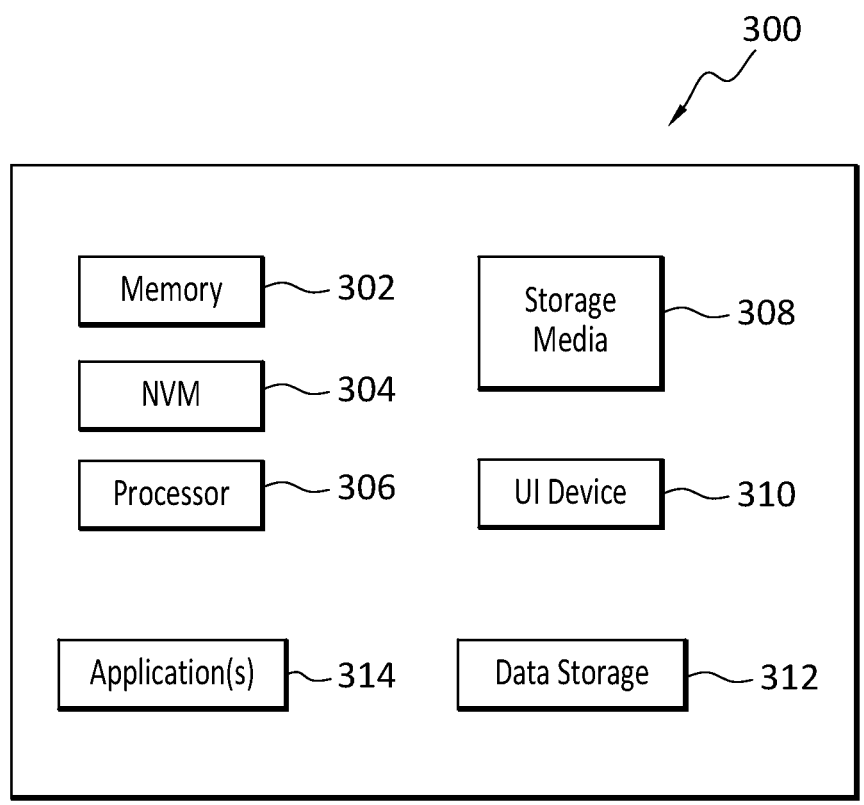
FIG. 3 discloses aspects of an example computing entity operable to perform any of the disclosed methods, processes, and operations.

With reference briefly now to FIG. 3, any one or more of the entities disclosed, or implied, by FIGS. 1-2 and/or elsewhere herein, may take the form of, or include, or be implemented on, or hosted by, a physical computing device, one example of which is denoted at 300. As well, where any of the aforementioned elements comprise or consist of a virtual machine (VM), that VM may constitute a virtualization of any combination of the physical components disclosed in FIG. 3.

In the example of FIG. 3, the physical computing device 300 includes a memory 302 which may include one, some, or all, of random access memory (RAM), non-volatile memory (NVM) 304 such as NVRAM for example, read-only memory (ROM), and persistent memory, one or more hardware processors 306, non-transitory storage media 308, UI (user interface) device 310, and data storage 312. One or more of the memory components 302 of the physical computing device 300 may take the form of solid state device (SSD) storage. As well, one or more applications 314 may be provided that comprise instructions executable by one or more hardware processors 306 to perform any of the operations, or portions thereof, disclosed herein.

Such executable instructions may take various forms including, for example, instructions executable to perform any method or portion thereof disclosed herein, and/or executable by/at any of a storage site, whether on-premises at an enterprise, or a cloud computing site, client, datacenter, data protection site including a cloud storage site, or backup server, to perform any of the functions disclosed herein. As well, such instructions may be executable to perform any of the other operations and methods, and any portions thereof, disclosed herein.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A method, comprising:

receiving, at a remote site from a production site, copies of production site assets, and the production site assets comprise one or more virtual machines;

storing, at the remote site, the copies of the production site assets;

using, at the remote site, the copies of the production site assets to restore a temporary production site;

running the temporary production site at the remote site; and restoring, from the remote site to the production site, the copies of the production site assets, wherein the copies of the production site assets received by the remote site are stored in a vault at the remote site, the vault being physically isolated from the production site when not receiving the production site a assets such that when the vault is physically isolated, the vault is not accessible by any communication system or other device outside of the vault.

2. The method as recited in claim 1, wherein the copies of the production site assets are received by the remote site from a vault at the production site.

3. The method as recited in claim 1, wherein the copies of the production site assets further comprise data and/or one or more containers operable to perform one or more production site functions.

4. The method as recited in claim 1, wherein restoring the temporary production site comprises restoring the copies of the production site assets from the vault at the remote site wherein the vault c Bases to be physically isolated from the production site when restoring the copies of the production site assets.

5. The method as recited in claim 1, wherein when the temporary production site is running, the temporary production site receives new and/or modified data from an entity.

6. The method as recited in claim 1, wherein the temporary production site runs while the production site is down.

7. The method as recited in claim 1, wherein the restoring, from the remote site to the production site, the copies of the production site assets, is performed after a time period during which the production site was down.

8. The method as recited in claim 1, wherein after the restoring, from the remote site to the production site, the copies of the production site assets, the temporary production site is shut down.

9. The method as recited in claim 1, wherein as part of the restoring of the copies of the production site assets, the remote site transmits data differentials to the production site.

10. A non-transitory storage medium having stored therein instructions that are executable by one or more hardware processors to perform operations comprising:

receiving, at a remote site from a production site, copies of production site assets, and the production site assets comprise one or more virtual machines;

storing, at the remote site, the copies of the production site assets;

using, at the remote site, the copies of the production site assets to restore a temporary production site;

running the temporary production site at the remote site; and restoring, from the remote site to the production site, the copies of the production site assets, wherein the copies of the production site assets received by the remote site are stored in a vault at the remote site, the vault being physically isolated from the production site when not receiving the production site assets such that when the vault is physically isolated, the vault is not accessible by any communication system or other device outside of the vault.

11. The non-transitory storage medium as recited in claim 10, wherein the copies of the production site assets are received by the remote site from a vault at the production site.

12. The non-transitory storage medium as recited in claim 10, wherein the copies of the production site assets further comprise data and/or one or more containers operable to perform one or more production site functions.

13. The non-transitory storage medium as recited in claim 10, wherein restoring the temporary production site comprises restoring the copies of the production site assets from a vault at the remote site, herein the vault ceases to be physically isolated from the production site when the copies of the production site assets.

14. The non-transitory storage medium as recited in claim 10, wherein when the temporary production site is running, the temporary production site receives new and/or modified data from an entity.

15. The non-transitory storage medium as recited in claim 10, wherein the temporary production site runs while the production site is down.

16. The non-transitory storage medium as recited in claim 10, wherein the restoring, from the remote site to the production site, the copies of the production site assets, is performed after a time period during which the production site was down.

17. The non-transitory storage medium as recited in claim 10, wherein after the restoring, from the remote site to the production site, the copies of the production site assets, the temporary production site is shut down.

18. The non-transitory storage medium as recited in claim 10, wherein as part of the restoring of the copies of the production site assets, the remote site transmits data differentials to the production site.

* * * * *